United States Patent
Northrup et al.

[11] Patent Number: 6,099,148
[45] Date of Patent: Aug. 8, 2000

[54] AIRWAY OBSTRUCTION LUMINAIRE

[75] Inventors: Richard M. Northrup, Nashua; George J. Mandeville, Hudson, both of N.H.

[73] Assignee: Flash Technology Corporation of America, Franklin, Tenn.

[21] Appl. No.: 09/168,865

[22] Filed: Oct. 9, 1998

[51] Int. Cl.[7] .................................. F21L 7/00; H01J 1/88
[52] U.S. Cl. ..................... 362/336; 362/186; 362/333; 313/271; 313/272
[58] Field of Search ............................... 362/186, 153.1, 362/333, 334, 336, 338, 297; 313/579, 271, 272, 273, 333, 343, 344

[56] References Cited

U.S. PATENT DOCUMENTS

| | | | |
|---|---|---|---|
| 3,731,082 | 5/1973 | Blaylock | 240/10.5 |
| 4,360,862 | 11/1982 | Strasser et al. | 362/240 |
| 4,717,991 | 1/1988 | Murphree, Jr. | 362/35 |
| 5,335,157 | 8/1994 | Lyons | 362/297 |

OTHER PUBLICATIONS

"Electric marine lantern type EE 380 N", Pintsch bamag Dinslaken catalog, Jul. 1998.
"Electric Marine Lantern type EE 155 N", "Electric marine lantern (with acrylic lens and acrylic cover) type EE 250 N", "Electric marine lantern type EE 380 N", "Mole head light type WF–300", Hazard Warning Beacon type GF–300, from Pintsch Bamag Dinslaken catalog labelled "Jul. 1998".

"Report of Test on Intensity Distribution Measurements of a 300–mm Hazard or Code Beacon When Lamped With Six Types of Incandescent Bulbs", U.S. Department of Commerce, National Bureau of Standards, Washington, DC, 1974.

*Primary Examiner*—Darren E. Schuberg
*Assistant Examiner*—Fayez Assaf
*Attorney, Agent, or Firm*—Michael J. Weins; Jeffrey E. Semprebon

[57] ABSTRACT

An airway obstruction luminaire has a luminaire base; a substantially cylindrical Fresnel lens having a lens axis; a halogen lamp having a lamp base, and a substantially linear filament; and a lamp bracket which positions the lamp such that a filament axis of the filament is coincident with the lens axis. The filament is energized by a power supply connected to a first filament end and second filament end, which are separated by an effective length $l_E$ of less than 1 inch. The filament is preferably formed as a helical coil. The lamp is designed to operate at a lamp rated voltage $V_L$ between about 12 and 30 volts. The power supply voltage $V_P$ is reduced if $V_P$ is greater than $V_L$. The second filament end is supported by a second end support structure configured to reduce shadowing. The lens is preferably an acrylic plastic lens fabricated by injection molding. The axial position of the lamp with respect to the lens may be adjusted by placing shims between the lamp base and the lamp bracket. The luminaire may be designed to meet the FAA requirements for type L-810 or type L-864 devices, and in the latter case is provided with a flashing circuit for periodically interrupting power to the lamp.

18 Claims, 9 Drawing Sheets

AIRWAY OBSTRUCTION LUMINAIRE

FIELD OF THE INVENTION

The present invention relates to luminaires which use a lamp in combination with a substantially cylindrical Fresnel lens, and more particularly to luminaires for use in airway obstruction beacons and lights which identify the location of a structure.

BACKGROUND OF THE INVENTION

Cylindrical Fresnel lenses have been used in combination with tungsten filament incandescent lamps to provide luminaires. Such luminaires have been used extensively for airway obstruction lights and beacons. When the luminaires are designed to emit light continuously, they are referred to as airway obstruction lights, and when they are designed to provide a flashing light, they are referred to as airway obstruction beacons. Classically, lamps having a horseshoe-shaped filament have been employed for such applications to provide a light source which resides substantially in a plane normal to the axis of the lens and near its center. While such luminaires have performed satisfactorily, they have not been energy efficient, and when used as beacons they have been found sufficient only when a pair of lamps and lens sections are employed. In the case of beacons, the requirement of using two lamps and lens sections increases the vertical cross section of the beacon. The lamps employed in lights and beacons also have relatively short lives, which is particularly undesirable since the luminaires are frequently not readily accessible.

Cylindrical Fresnel lenses in combination with strobe lamps have been used in some applications. However, when these strobe lamps are used the emitted light creates a time dependent pattern of short, intense bursts of light. This pattern is substantially different from either the light pattern generated by airway obstruction lights, which to provide a time independent pattern of light, or airway obstruction beacons, which provide a pattern of flashes where the duration of the "on" time is substantial.

While strobes are considered to be very effective as obstruction warning beacons from the perspective of aircraft pilots, residents in the vicinity may consider their time dependent light pattern a nuisance at night and prefer the use of red incandescent beacons. For this reason, it has become a common practice to modify nighttime strobe flashes to somewhat resemble flashes from incandescent beacons, including changing the color of the emitted light to red.

It is possible to emulate the flash pattern of an incandescent lamp beacon with an airway obstruction beacon employing a strobe lamp; however, these strobe-lit airway obstruction beacons require relatively complex circuitry to provide a perceived beam which emulates the time dependent light pattern where the duration of the "on" time of the flashes is substantial, let alone to provide a beacon which emulates a continuous light source. This circuitry increases the cost of the beacons and may foreshorten the life of the strobe lamp.

A study on the use of halogen lamps to replace the conventional tungsten filament lamps in airway obstruction beacons was reported in 1974 to the FAA by NBS (National Bureau of Standards), now NIST. In this report, various tungsten and halogen lamps were tested in combination with a standard beacon 300 mm cylindrical Fresnel lens, and it was concluded that the halogen lamps did not offer significant advantages over tungsten filament lamps. It was noted that a halogen lamp having a smaller filament provided a greater emitted light intensity, but such lamps had a prohibitively short life.

SUMMARY OF THE INVENTION

In an elementary form, the luminaires of the present invention have a luminaire base which is designed to be mounted on a structure which is obstructing the airway. A substantially cylindrical Fresnel lens attaches to the luminaire base. The Fresnel lens has a lens axis and a focal center which resides on the lens axis. The term "substantially cylindrical" in this discussion shall refer to the shape of a sidewall of the Fresnel lens, and includes lenses having similar sidewall shapes such as frusto-conical sidewalls. When the Fresnel lens is to be fabricated by molding, it is preferred for the Fresnel lens to be frusto-conical in overall shape to facilitate removal from the mold. For the quasi-cylindrical Fresnel lens, the lens diameter D is the mean diameter of the Fresnel lens.

A halogen lamp is provided which resides inside the Fresnel lens. The lamp has a lamp base, and a lamp envelope which attaches to the lamp base. A substantially linear filament resides in the lamp envelope and is energized by a power supply.

The filament has a filament wire having a gauge g and a wire length $l_W$, and terminates in a first filament end and second filament end, with the first filament end being closer to the lamp base. The filament wire is configured such that the resulting substantially linear filament has a filament axis which is substantially aligned with the lens axis. It is preferred that the filament have an effective length $l_E$ which is the linear distance between the first filament end and the second filament end. The effective length $l_E$ is maintained at less than about 1 inch (25 mm).

The filament is supported in part by a first end filament lead attaching to the first filament end. The first end filament lead passes through the lamp base. The filament is also supported by a second end support structure, which also serves as a second end filament lead, attaching to the second filament end and passing through the lamp base. The first end filament lead and the second end support structure communicate with the power supply. When the power supply energizes the filament, electrical current passes through the filament and a voltage is established across the filament. The lamp is designed to operate such that a lamp rated voltage $V_L$ is dropped across the filament.

A lamp bracket is provided to position the lamp with respect to the Fresnel lens. The lamp bracket attaches to both the luminaire base and to the lamp base. The lamp and the Fresnel lens are so positioned that the filament axis is essentially coincident with the lens axis. Preferably, the filament is substantially centered with respect to the Fresnel lens, residing at or near the focal center.

To foreshorten the effective length $l_E$ of the filament, it is preferred that the filament wire be configured into a helical coil. The coil provides the filament with a coil height h, which is the effective length $l_E$ of the filament, and a coil diameter d. The coil height h is substantially greater than the coil diameter d, and the ratio of h:d is preferably at least about 2½:1. While the filament wire may be simply wound in a single helix to form the coil, it is further preferred for the filament wire to be wound first into an initial helical coil, and the initial helical coil be again wound into a larger helical coil, creating a double helical coil having the coil height h and the coil diameter d. In all cases, the particular winding of the coiled filament determines a relationship between the coil height h and the coil diameter d and the filament wire length $l_W$.

The size and configuration of the filament of the lamp in an airway obstruction luminaire is critical, since these features effect the quantity of light emitted, the distribution of the light, and the useful life of the lamp.

In order to keep the coil diameter d and coil height h small, while maintaining a desired operating power W, the gauge g of the filament wire should be small; however, the use of very fine wire results in mechanical weakness, as well as reducing the lamp life due to thermal-electrical effects when the filament is in service. It has been found that a halogen lamp designed to operate such that the lamp rated voltage $V_L$ (across the filament) is between about 12 and 30 volts can provide the power required for airway obstruction luminaires while maintaining an acceptable life of the lamp.

To facilitate focusing of the emitted light by the substantially cylindrical Fresnel lens, the coil diameter d should be substantially smaller than the lens diameter D of the Fresnel lens. Preferably, the ratio D:d is at least about 40:1.

In general, for a lamp used in combination with a substantially cylindrical Fresnel lens, it is preferred that not only the coil diameter d be small, but also that the coil height h be relatively small compared to the lens diameter D. While it is important that the coil height h be relatively small, there is a lower limit, since the coil height h must be of sufficient length to provide enough divergence of emitted light to provide a vertical beam spread sufficient to meet the requirement of a particular application. These vertical beam spread requirements for particular airway obstruction lights and beacons are established by the FAA.

In general, to a first approximation, the minimum height h may be determined by the following equation:

$$\theta = 2 \cdot \arctan(h/D) \qquad \text{(Equation 1)}$$

where $\theta$ is the angle of the total vertical spread of the emitted light beam above and below horizontal when the filament is positioned at the focal center of the Fresnel lens.

In addition to requirements with regard to vertical beam spread, the FAA establishes requirements for intensity of the emitted light beam. For a given geometry of filament and Fresnel lens, the light intensity is dependent on the luminous power which the lamp provides. The luminous power in turn is dependant on the electrical power W of the lamp, in a manner which also involves the lamp life expectancy and the rated lamp rated voltage $V_L$. It is characteristic of halogen lamps to exhibit longer service life for any given luminous power as the rated lamp rated voltage $V_L$ is decreased.

To more effectively transmit power from the power supply operating at a supply voltage $V_P$ to a lamp designed to operate at the lamp rated voltage $V_L$, it is preferred to have the supply voltage $V_P$ greater than the lamp rated voltage $V_L$ to reduce power losses in transmission. When $V_P$ is greater than $V_L$, means for reducing the power supply voltage $V_P$ are provided. It is preferred for the means for reducing the power supply voltage $V_P$ to be in close proximity to the luminaire to reduce transmission losses from long power lines. To simplify installation of the luminaire, it is further preferred for the means for reducing the power supply voltage $V_P$ to be an integral part of the luminaire.

To reduce shadowing cast by the second end support structure, it is preferred for that the second end support structure be configured to reduce shadowing which it casts upon the Fresnel lens with respect to any given radial direction. Reducing the shadowing with respect to any given radial direction effectively reduces the shadowing seen by an observer in such direction, and provides a more even radial distribution of the light emitted by the lamp. Such reduced shadowing can be accomplished by providing a support structure which is inclined with respect to the lamp filament, or by reducing the cross section of the second end support structure.

An inclination of the second end support structure can be achieved by forming the second end support structure as a helix or a ramp. Such a configuration of the second end support structure reduces the shadow cast by the second end support structure in any given radial direction.

Simply reducing the cross section of the members which provide the second end support structure is feasible when the reduced cross section is sufficient to provide the strength and conductivity required. To further reduce the cross section, the second end support can employ at least two second end filament leads which are spaced apart and substantially separated from the filament. It is still further preferred for the at least two second end filament leads to be symmetrically disposed about the filament. The employment of at least two spaced apart second end filament leads allows each of the individual second end filament leads to have a reduced cross section, thus reducing shadows cast by the second end filament leads in any given radial direction.

It is further preferred that the Fresnel lens be a plastic lens. Use of plastic lenses simplifies the fabrication of the lenses and facilitates the fabrication of lenses with improved optical properties, since such plastic lenses can be readily fabricated by molding. Employing a plastic lens also reduces the weight of the resulting luminaire. It is further preferred that the plastic be a high temperature, UV-stabilized acrylic to provide a Fresnel lens having good optical properties, a long service life, and more stable color characteristic. Such a Fresnel lens fabricated from an acrylic plastic can be injection molded, thereby maintaining a moderate cost of fabrication. As noted above, when the Fresnel lens is fabricated by molding, the cylindrical sidewall of the lens is provided with a slight draft, thus slightly distorting the cylinder to a frusto-conical shape. To meet the FAA requirements for airway warning lights and beacons, the Fresnel lens is preferably formed of a transparent red plastic. Preferably, the Fresnel lens is provided with a cap of metal or other heat-conductive material to prevent overheating.

It is also preferred that means for adjusting the axial position of the lamp base with respect to the Fresnel lens are provided. The means for adjusting the axial position of the lamp base allow the beam spread of emitted light to be vertically aimed, as well as allowing adjustment of the position of the lamp to compensate for manufacturing variation in the distance of the filament from the lamp base. Such means may be provided by configuring the lamp base and the lamp bracket so as to allow adjustable attachment of the lamp base to the lamp bracket. In one preferred embodiment, shims of varying thickness may be placed between the lamp base and the lamp bracket to adjust the axial position of the lamp.

For warning lights used to identify airway obstructions, luminaires are employed which are typically relatively compact and are designed to operate in a mode which provides a continuous illumination. These luminaires must meet the following FAA requirements for a type L-810 device:

The center of the vertical beam spread shall lie between +4 and +20 degrees. With a minimum vertical beam spread of 10 degrees and at all radials throughout the omnidirectional 360 degrees, there shall be a minimum intensity of 32.5 candela.

Classically, airway obstruction warning lights have a lens diameter D of about 3 inches (76 mm) and a lens height H of about 4 inches (102 mm). Thus, if such a lens geometry is chosen, a commercially available Fresnel lens can be employed to reduce the development cost for the warning light. When the lens diameter D of the Fresnel lens is maintained at about 3 inches (76 mm), then the filament height h is preferably about 0.2–0.3 inches (5–8 mm), and the halogen lamp requires an operating power W of about 25–40 watts to meet the FAA intensity requirements when the lamp rated voltage $V_L$ is designed to be about 12–24 volts.

For use as airway obstruction warning beacons, luminaires are larger in size than those employed for warning lights, and provide an intermittent light source of greater intensity. They must meet the following FAA requirements for a type L-864 device:

At all radials throughout the omnidirectional 360 degrees, there shall be a peak effective intensity of 2,000±25% candela. There shall also be a minimum effective intensity of 750 candela throughout a minimum vertical beam spread of 3 degrees.

When the light unit is leveled the intensity at zero degrees elevation angle (horizontal) shall be at least as great as the minimum specified peak effective, intensity. The light unit must produce at least ½ the minimum allowable peak intensity at −1.0 degree.

When the luminaire of the present invention is employed as an airway obstruction warning beacon, it is again preferred to maintain a short filament height h to increase the intensity of the beam emitted by the beacon; however, the filament height h is limited so as to maintain a vertical beam spread of at least 3°. This requirement, in combination with the application of Equation 1, leads to the selection of a preferred minimum filament height h of about ½ inch (13 mm) when used with Fresnel lenses having a lens diameter D in the neighborhood of 12–15 inches (305–381 mm), which is the size range commonly used for such applications. While the filament height h can be greater, it is preferred to maintain the height at or near the minimum to optimize the power requirements. When the filament height h is so maintained and the Fresnel lens has a lens diameter D of about 12–15 inches (305–381 mm), the power requirement for the halogen lamp is about 400 watts for an airway obstruction beacon which meets both the FAA requirements and has an acceptable lamp life. This requirement can be maintained with a lamp rated voltage $V_L$ of between about 20 and 30 volts. When the lamp is so operated, it provides the intensity required with a filament having a satisfactory life.

For the reasons set forth above, it is preferred for airway obstruction warning beacons that the Fresnel lens and the filament be selected such that the relationship of the lens diameter D to the coil height h provides a ratio of h:D which is maintained greater than about 0.026, and preferably less than about 0.035. This range of values for the ratio of h:D provides a vertical beam width which complies with FAA specifications, but is not so great as to require an unnecessary increase in the luminous power of the lamp needed to achieve the FAA specified intensity for such airway obstruction beacons.

For the preferred geometry and for the preferred voltages discussed above, the time constant for the decay of the illumination is such that if the voltage is applied cyclically, the light can be made to flash at intervals required for airway obstruction beacons. When the luminaire is to be employed for such applications, means for periodically interrupting communication between the power supply and the lamp are provided. Such means for periodically interrupting communication between the power supply and the lamp may be either internal to the beacon or external to the beacon, depending on needs of the particular application.

BEST MODE OF CARRYING THE INVENTION INTO PRACTICE

Figure 1:
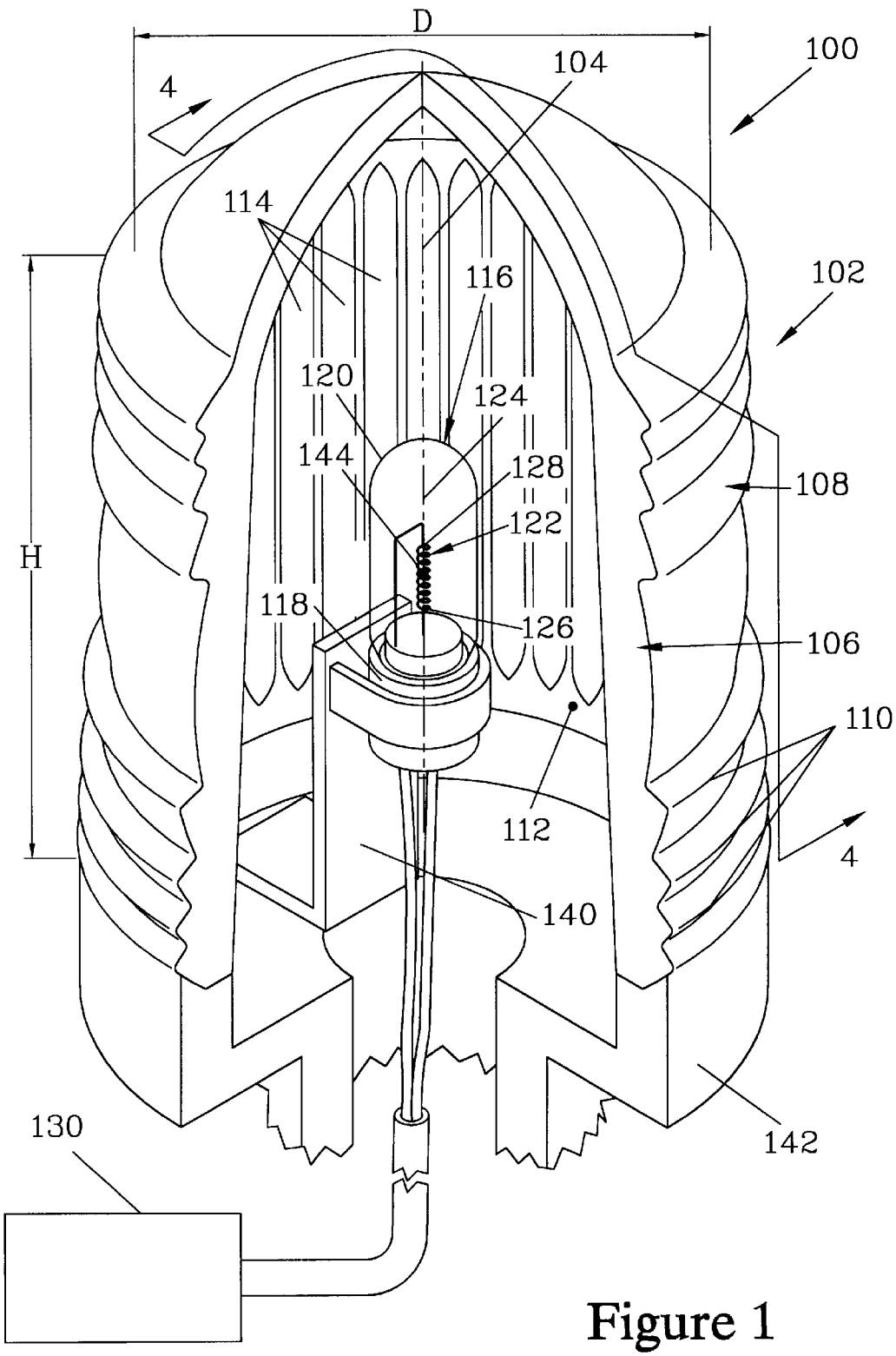
FIG. 1 is a cutaway isometric view of a luminaire which forms one embodiment of the present invention. The luminaire is designed for use as an airway obstruction warning light. The luminaire has a halogen lamp and a substantially cylindrical Fresnel lens with a series of internal ribs which serve to horizontally diffuse the light emitted from the lamp. The lamp has a substantially linear filament. A luminaire base is adapted to be mounted to a structure, and the Fresnel lens and the lamp are mounted to the luminaire base.

FIG. 1 is schematic representation of one embodiment of a luminaire 100 of the present invention. The luminaire 100 utilizes a substantially cylindrical Fresnel lens 102 having a lens axis 104. The Fresnel lens 102 is fabricated from glass and has a sidewall 106 which is symmetrically disposed about the lens axis 104 and forms a frusto-conical surface having a mean lens diameter D and a lens height H. The sidewall 106 has an outer surface 108 which has a series of horizontal ridges 110 which serve to focus light in vertical planes as it passes therethrough. The Fresnel lens 102 has an inner surface 112 which has a series of vertical ridges 114 which serve to diffuse light in horizontal planes. These vertical ridges 114 are employed on currently available Fresnel lenses used for airway obstruction warning lights, since these vertical ridges 114 are required for lights which employ tungsten filament incandescent lamps. The vertical ridges 114 serve to radially distribute the light to minimize shadowing, but they decrease the efficiency of the Fresnel lens 102.

The luminaire 100 employs a halogen lamp 116 which resides in the Fresnel lens 102. The lamp 116 has a lamp base 118 and a lamp envelope 120 which is attached thereto. The lamp 116 has a substantially linear filament 122 having a filament axis 124 which is substantially aligned with the lens axis 104. The filament 122 resides in the lamp envelope 120 and terminates in a first filament end 126 and a second filament end 128. The filament 122 is energized by a power supply 130.

Figure 2:
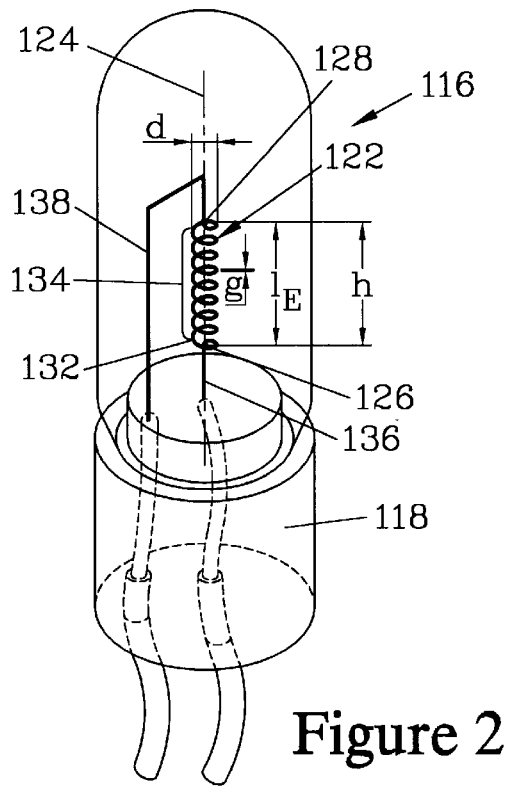
FIG. 2 is an isometric view of the lamp shown in FIG. 1, illustrating further details.

FIG. 2 illustrates the lamp 116 shown in FIG. 1 in greater detail. In this embodiment, the filament 122 is fabricated from a filament wire 132 having a gauge g and a wire length $l_W$ (not shown), strung between the first filament end 126 and the second filament end 128. The linear separation between the first filament end 126 and the second filament end 128 is defined as the effective length $l_E$ of the filament 122. To decrease the effective length $l_E$ of the filament 122 while maintaining the wire length $l_W$, it is preferred that the filament wire 132 be wound into a filament coil 134 having a coil height h and a coil diameter d. In this case, the coil height h is the effective length $l_E$. The filament coil 134 is symmetrically disposed about the filament axis 124. To maintain the focusing capacity of the Fresnel lens 102, it is preferred that the ratio of the mean lens diameter D to the coil diameter d be maintained such that D:d is at least about 40:1.

Figure 3:
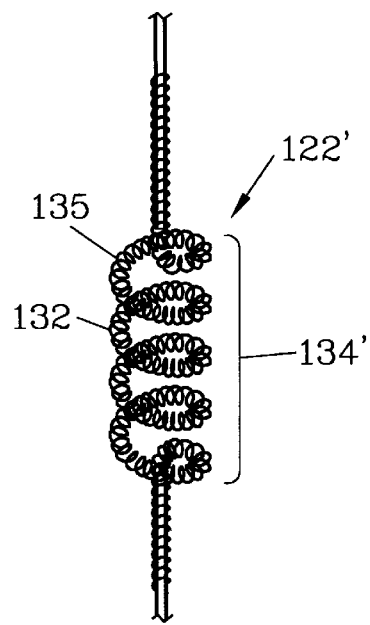
FIG. 3 is a schematic representation of a preferred configuration of the substantially linear filament which is formed as a double wound helical coil.

FIG. 3 illustrates another configuration of the filament of the present invention, wherein the filament 122' is again formed from a filament wire 132 having a gauge g; however, in this embodiment the wire 132 is first wound into a spiral 135 which in turn is wound into a coil 134', thereby further increasing the wire length $l_W$ while the effective length $l_E$ remains constant.

Figure 4:
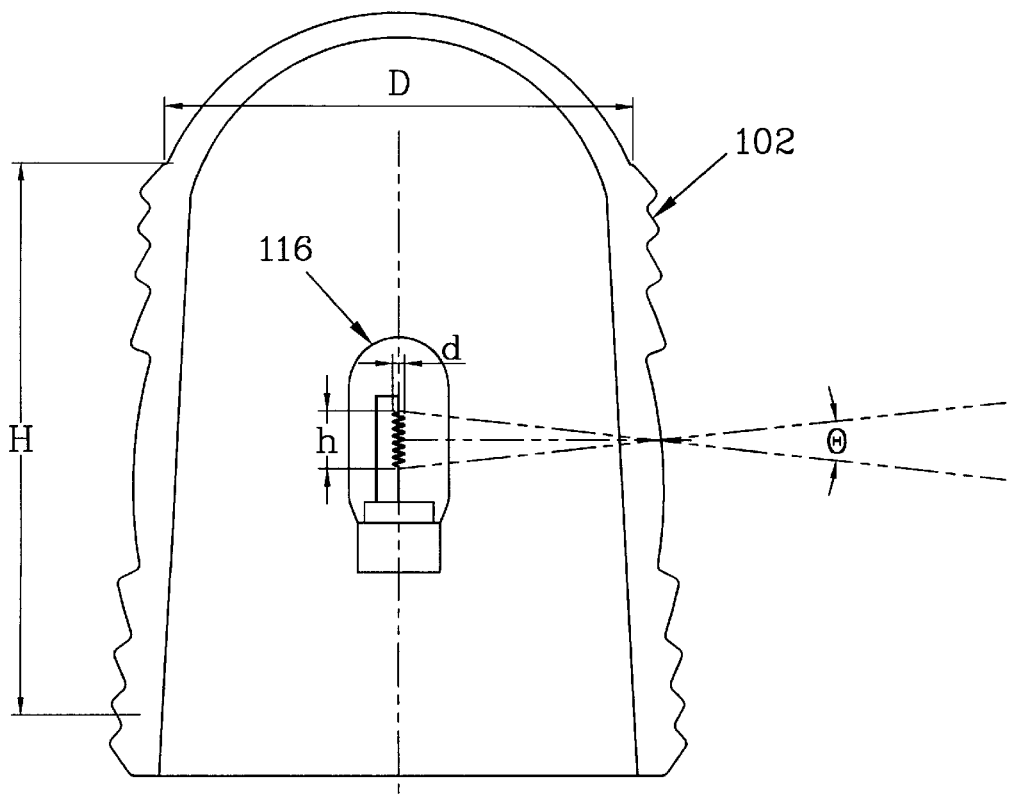
FIG. 4 is a schematic view of the section 4—4 of FIG. 1, illustrating the relationship of the dimensions of the Fresnel lens and the filament shown in FIGS. 1 and 2.

FIG. 4 illustrates the section 4—4 of FIG. 1 and provides a visual representation of the effect of the coil height h on the vertical spread of the emitted beam of light. In general, to a first approximation, the minimum coil height h may be determined by:

$$\theta = 2*\arctan(h/D) \qquad \text{(Equation 1)}$$

which, when rearranged, becomes:

$$h/D = \tan\theta/2. \qquad \text{(Equation 1')}$$

In general, for an airway obstruction warning light, the minimum h/D will be about 0.09, while for an airway obstruction beacon it will be about 0.026.

Additionally, it is desirable to minimize the ratio of h/D, since excessive vertical beam spread increases the luminous power which the lamp must provide to meet the specified intensity requirements. For optimal power efficiency, a practical upper limit of θ for airway obstruction lights is about 12°. Entering this value in Equation 1' indicates that h/D should be less than about 0.1. While there is no upper limit of the lens diameter D, it is practical to limit D to about 5 inches (127 mm) for airway obstruction lights, and thus it is reasonable to set an upper limit of h at about 0.5 inches (13 mm) for airway obstruction lights. For airway obstruction beacons, a practical upper limit for θ is about 50, which indicates that h/D should be less than about 0.05. It is practical to limit D and about 20 inches (508 mm) for airway obstruction beacons, and more preferably about 12–15 inches (305–381 mm), and thus it is reasonable to set an upper limit of h at about 1 inch (25 mm).

It should also be noted that the lens height H of the Fresnel lens affects the amount of light collected by the Fresnel lens for any given lens diameter D. It has been found empirically that when the lens height H is about equal to the lens diameter D, a 100% increase in the lens height H increases the peak beam intensity by only about 20% when the beam width is 5°. Thus, the value of H should be selected to provide a balance between optimization of the amount of light collected and minimization of the size and weight of the resulting luminaire. For most applications, it has been found practical to maintain the ratio of H/D between about 0.8 and 2.

Referring again to FIG. 2, the filament 122 is supported in part by a first end filament lead 136 which attaches to the first filament end 126. The first end filament lead 136 passes through the lamp base 118. The second filament end 128 is supported by a single second end filament lead 138 which both serves as a second end support structure to support the second filament end 128, as well as providing a conductive path thereto. The second end filament lead 138 attaches to the second filament end 128. This second end filament lead 138 has a substantial thickness and results in a shadow being cast onto the Fresnel lens 102. While this structure results in a radially non-isotropic light distribution, the degree of non-isotropic distribution is substantially less than with tungsten filament lamps and, if properly maintained, can produce a lamp with acceptable shadowing. Furthermore, even if the shadowing of the lamp 116 does not meet the requirements for radial distribution of the emitted light, the vertical ridges 114 of the Fresnel lens 102 tend to diffuse this shadowing to provide a distribution of light which can readily meet the FAA requirements.

A lamp bracket 140 attaches to the lamp base 118 and to a luminaire base 142, which in turn attaches to a structure (not shown) which is the airway obstruction for which the luminaire 100 is providing notice. The lamp bracket 140 is configured such that the filament axis 124 is aligned with the lens axis 104 and the filament 122 is substantially centered with respect to the Fresnel lens 102. When the lamp bracket 140 is so configured, the filament 122 will be positioned such that it resides at or near a focal center 144 of the Fresnel lens 102.

It is preferred to select the lamp 116 to have a lamp rated voltage $V_L$ of between about 12 volts and 30 volts. Designing the lamp 116 to operate at voltages in this range assures that the life expectancy of the resulting filament 122 will be reasonably long, thus overcoming the problem set forth in the NBS report. In the embodiment shown in FIG. 1, the power supply 130 supplies power at a power supply voltage $V_P$ which is the same as the lamp rated voltage $V_L$ of the lamp 116, and thus can be used directly to power the lamp 116.

Figure 5:
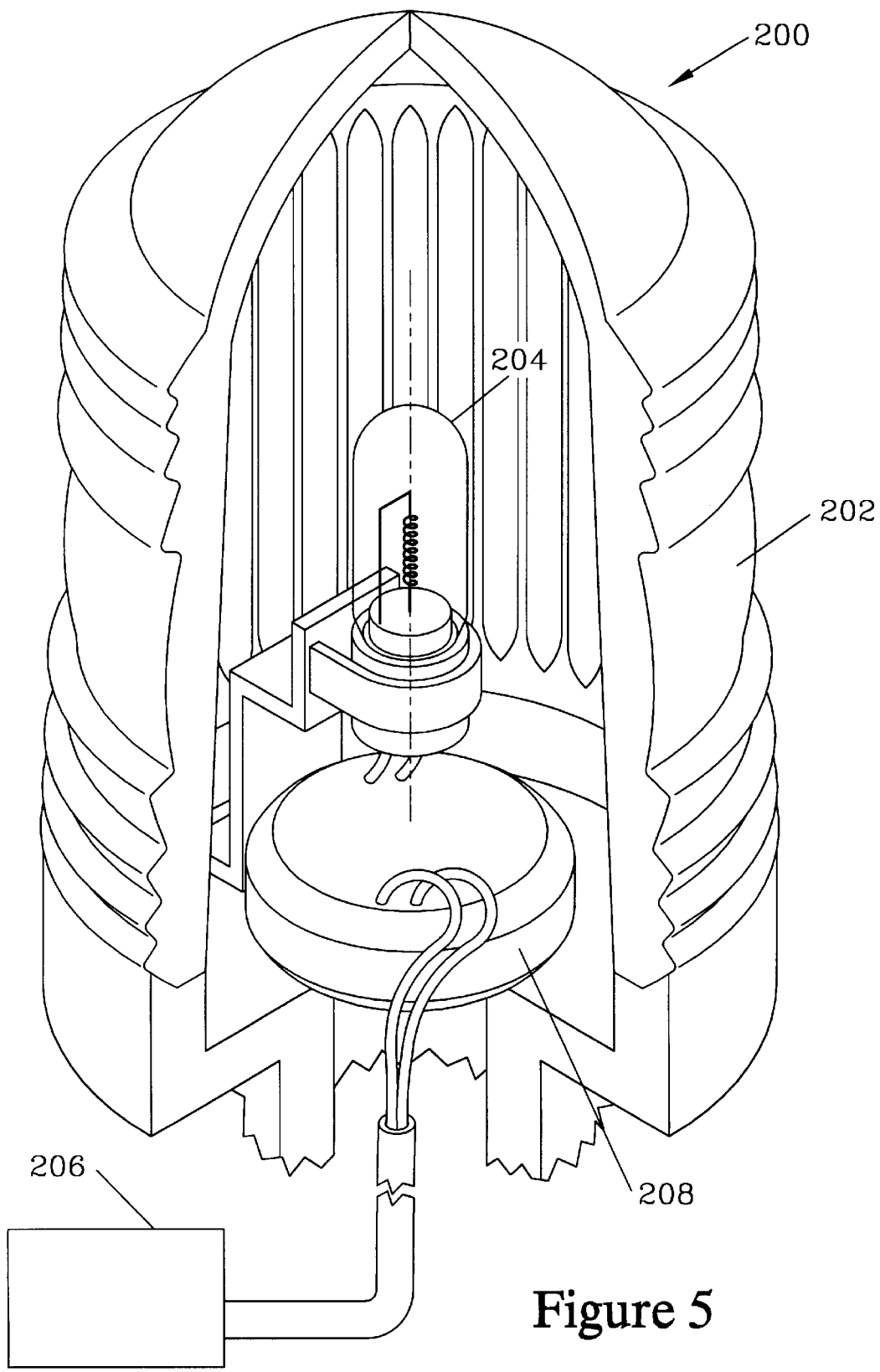
FIG. 5 is a cutaway isometric view illustrating a luminaire which shares many features in common with the luminaire shown in FIG. 1, but where the lamp is designed to be optimally operated at a lamp rated voltage $V_L$ which is less than the voltage provided by a power supply $V_P$. The luminaire of this embodiment has a step-down transformer which provides means for reducing the power supply voltage to the lamp rated voltage.

FIG. 5 is an isometric view of a luminaire 200 which is similar to the luminaire 100. The luminaire 200 again has a substantially cylindrical Fresnel lens 202 with the same features as the Fresnel lens 102, and has a halogen lamp 204 which is powered by a power supply 206 operating at a supply voltage $V_P$. The lamp 204 has the same components and spacial relationship with regard to the Fresnel lens 202 as does the lamp 116 with respect to the Fresnel lens 102.

Again, the lamp 204 has a lamp rated voltage $V_L$; however, in this embodiment, the lamp rated voltage $V_L$ differs from the supply voltage $V_P$, and a transformer 208 is interposed between the lamp 204 and the power supply 206. It should be appreciated that other means for reducing the supply voltage $V_P$, such as an electronic voltage controller, could be employed in place of the transformer 208. In this embodiment, the transformer 208 is located within the luminaire 200. Making the transformer 208 internal to the luminaire 200 is preferred, to facilitate retrofitting the luminaire 200 as a replacement for prior art luminaires which employ tungsten filament lamps. Having the transformer 208 internal is also beneficial when the power supply operates at a supply voltage $V_P$ which is substantially higher than the lamp rated voltage $V_L$ since power losses are reduced when power is transferred at higher voltages. Thus, when means are employed to reduce the voltage for the lamp, it is preferred that such means be in close proximity to the luminaire if not internal.

Figure 6:
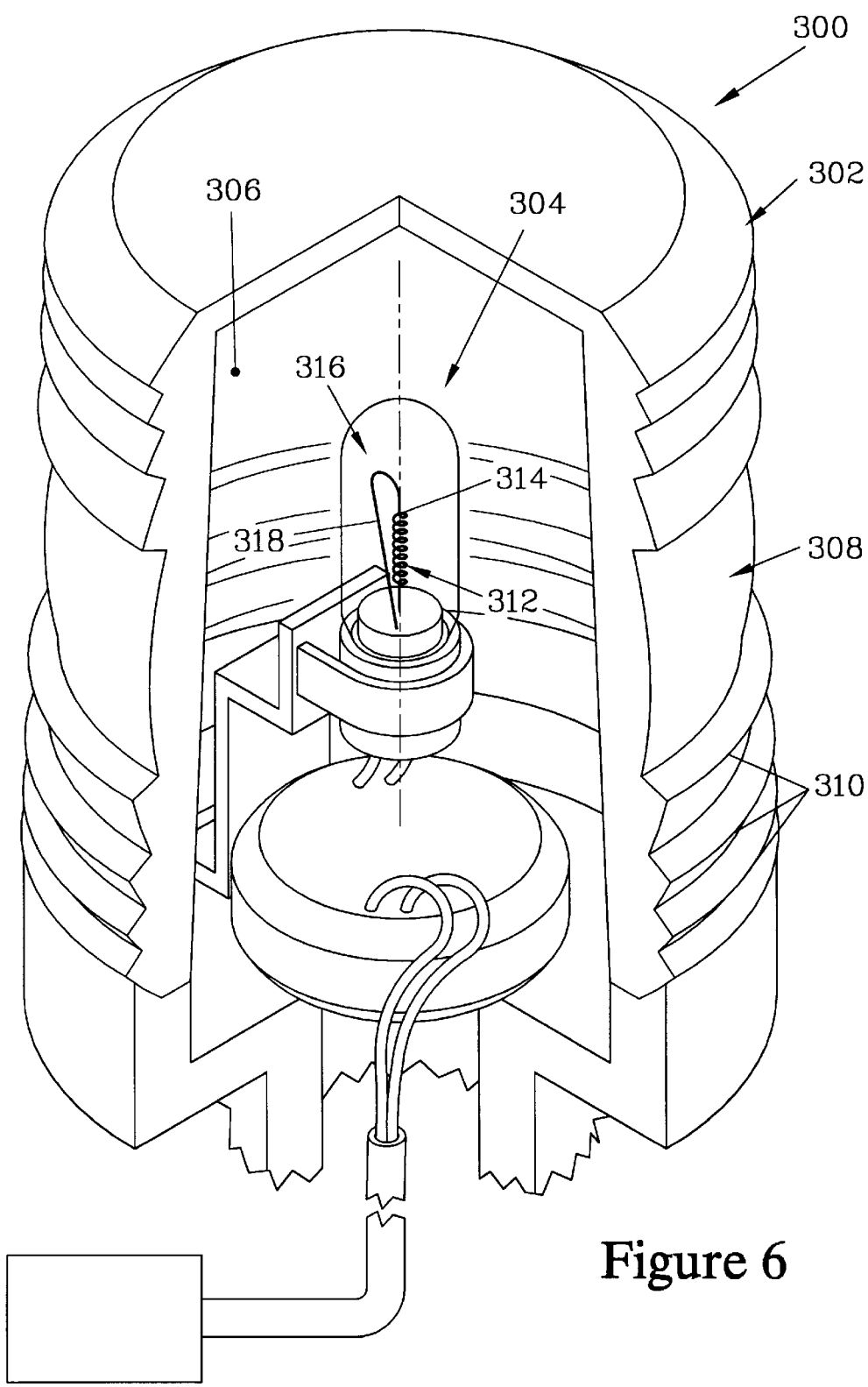
FIG. 6 is an isometric view of a luminaire of another embodiment which is similar to the embodiment illustrated in FIG. 5, but differs in part by employing an acrylic substantially cylindrical Fresnel lens and a lamp with a different substantially linear filament support system. The Fresnel lens is fabricated from an injected molded acrylic which enhances the vertical focusing power of the Fresnel lens, and has a smooth internal surface (rib free) which reduces the horizontal diffusion of the light emitted from the lamp. The filament has a first filament end and a second filament end. A first end conductive filament lead attaches to the first filament end, while the second filament end is supported by a ramp-shaped support which attaches to the second filament end. The ramp-shaped support reduces the shadow cast by the second filament support structure in any given radial direction, which eliminates the need for internal ribs to horizontally diffuse the light from the lamp.

FIG. 6 is an isometric view of a luminaire 300 which differs from the luminaire 200 both with respect to the details of a substantially cylindrical Fresnel lens 302 and a companion halogen lamp 304.

The Fresnel lens 302 differs in part from the Fresnel lenses (102 and 202) discussed above in that the Fresnel lens 302 has an inner surface 306 which is free from vertical ridges, such as the ridges 114 which form part of the inner surface 112 of the Fresnel lens 102 of the embodiment of FIG. 1 and of the Fresnel lens 202 of the embodiment of FIG. 5. The Fresnel lens 302 also differs in that it is fabricated from a thermoplastic material rather than glass. The thermoplastic selected is a high temperature acrylic plastic which is commercially available, such as Plexiglas V825 made by Rohm & Haas, which can be readily injection-molded to provide closer tolerances of an outer surface 308 than can be readily obtained in glass Fresnel lenses. These closer tolerances allow maintaining sharper definition of a series of horizontal ridges 310 to more effectively focus the light in vertical planes. The acrylic material should be chosen to have a high softening temperature, preferably in excess of about 115 degrees C. It is also preferred for the acrylic to be UV stabilized to prevent derogation of the lens 302 over time from exposure to sunlight.

The lamp 304 again has a substantially linear filament 312, having a second filament end 314 supported by a second end support structure 316. While the elimination of vertical ridges as noted above enhances the effectiveness of the Fresnel lens 302, this enhancement is at the cost of increased sensitivity to shadows cast by the second end support structure 316. To reduce the effect of the second end support structure 316, the second filament end 314 is supported by a ramp-shaped support 318 which assures that the shadow cast by the second end support structure 316 is not in a vertical line, thereby reducing the density and distribution of the resulting shadows when viewed from any particular radial direction.

Figure 7:
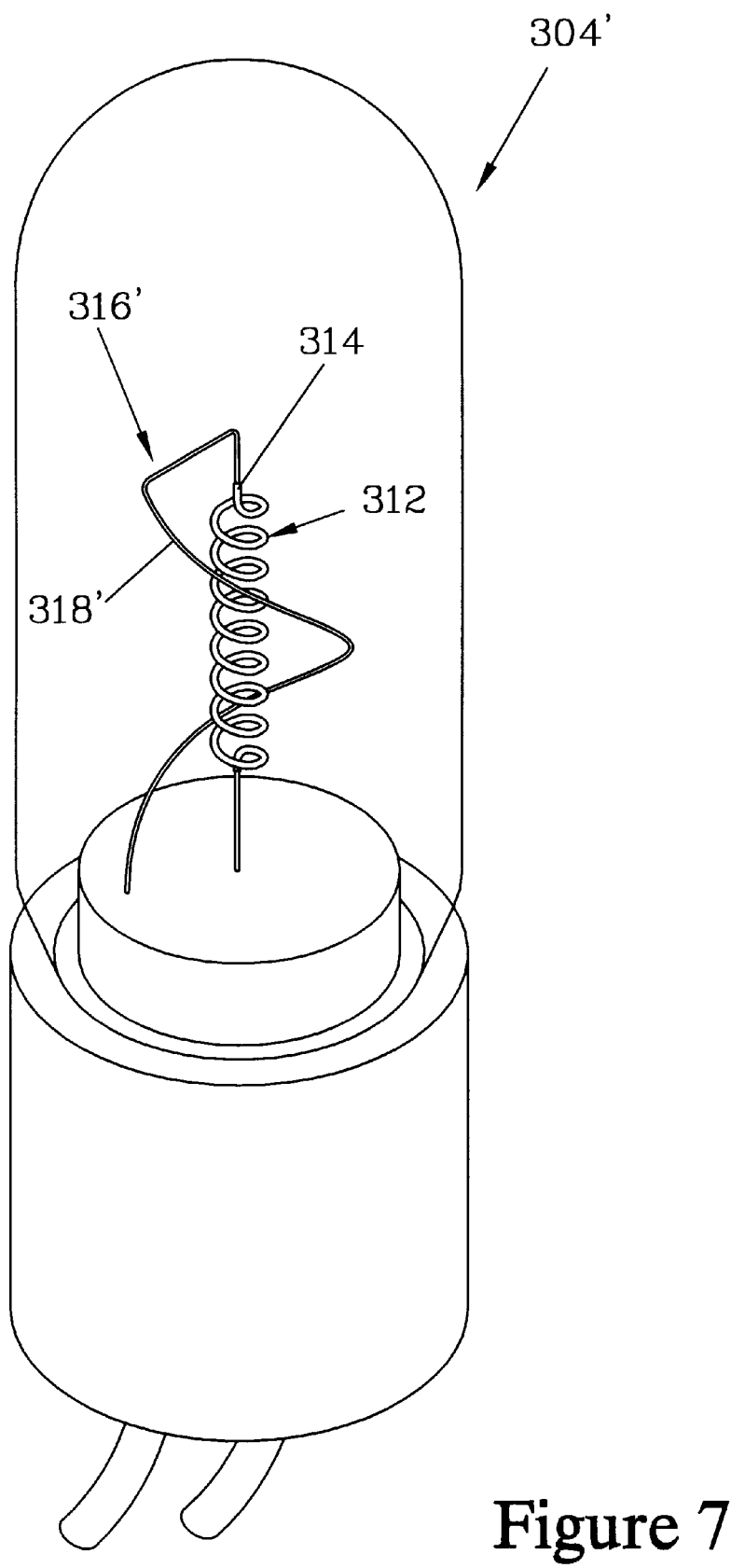
FIG. 7 is an isometric view of a lamp which employs an alternative second end structure to that of the lamp illustrated in FIG. 6. The lamp of this embodiment employs a helix-shaped support to reduce the shadow cast by the second filament support structure in any given radial direction.

FIG. 7 is an enlarged view illustrating an alternative halogen lamp 304' which can be employed to reduce shadowing. The lamp 304' has a second end support structure 316' having a helix-shaped support 318' for supporting the second filament end 314. The helix-shaped support 318' provides a greater inclination with respect to the filament 312 than is practical with the ramp-shaped support 318 discussed above, since the inclination of such a ramp-shaped support is limited by the size of the lamp envelope. Increasing the inclination of the second end support structure with respect to the filament 312 provides a more even radial distribution of emitted light.

Figure 8:
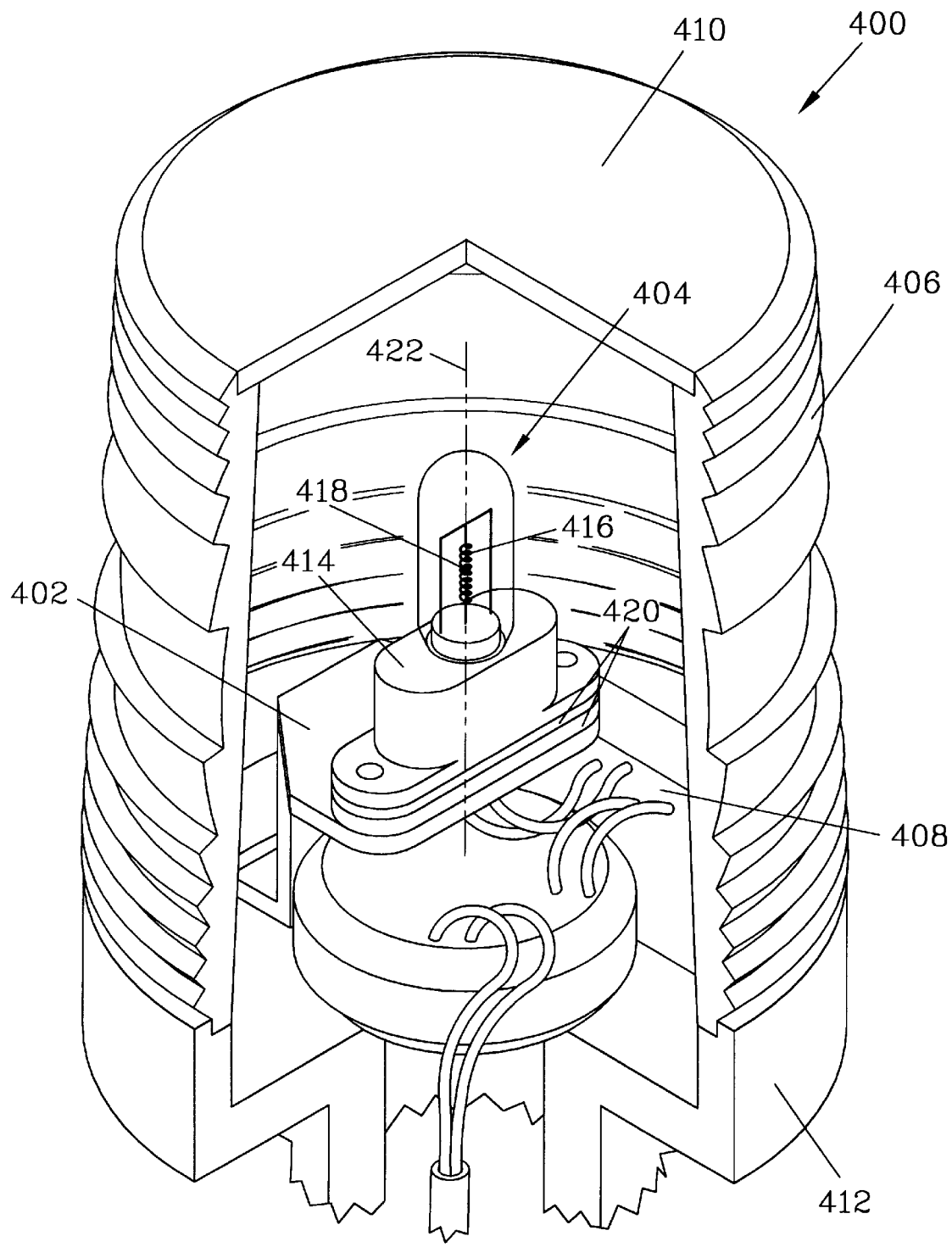
FIG. 8 is an isometric view of a luminaire of another embodiment of the present invention, for providing an airway obstruction warning beacon. The luminaire has a substantially cylindrical Fresnel lens and a halogen lamp having a substantially linear filament, the Fresnel lens and the lamp incorporating many of the features of the embodiment shown in FIG. 6. However, in this embodiment the second end support structure is formed by two second end filament leads, each of which has a reduced cross section which reduces shadowing and eliminates the need to employ vertical ridges on the lens. In this embodiment, the lamp is adjustably mounted to a lamp bracket to allow the axial position of the lamp with respect to the Fresnel lens to be adjusted. Means for reducing a power supply voltage to the lamp rated voltage are provided, as well as means for intermittently supplying voltage to the lamp to provide a flashing light output.

FIG. 8 is an isometric view of a luminaire 400 which is configured to be well suited for use as an airway obstruction beacon. The luminaire 400 differs from the luminaire 300 in four principal respects. The luminaire 400 has an adjustable lamp bracket 402 which provides for adjustment of a lamp 404 with respect to a substantially cylindrical Fresnel lens 406; the lamp 404 is configured differently; the luminaire 400 has a flashing circuit 408 which is housed in the luminaire 400; and the lens 406 is provided with a metal top 410 which serves to dissipate any heat buildup from the lamp 404.

The lamp bracket 402 attaches to a luminaire base 412 and to a lamp base 414 of the lamp 404. The lamp bracket 402, in combination with the luminaire base 412, is configured to position the lamp 404 at a desired location relative to the Fresnel lens 406, such that a substantially linear filament 416 of the lamp 404 is centrally positioned with respect to the Fresnel lens 406.

Means for adjusting the axial position of the lamp 404 with respect to the Fresnel lens 406 are provided. The means for adjusting the axial position of the lamp 404 allow the axial position of the lamp 404 to be adjusted with respect to a focal center 418 of the Fresnel lens 406. The means for adjusting the axial position of the lamp 404 allow compensation for manufacturing variations in the position of the filament 416 with respect to the lamp base 414, as well as allowing vertical aiming of the emitted light beam as is discussed below.

Figure 9:
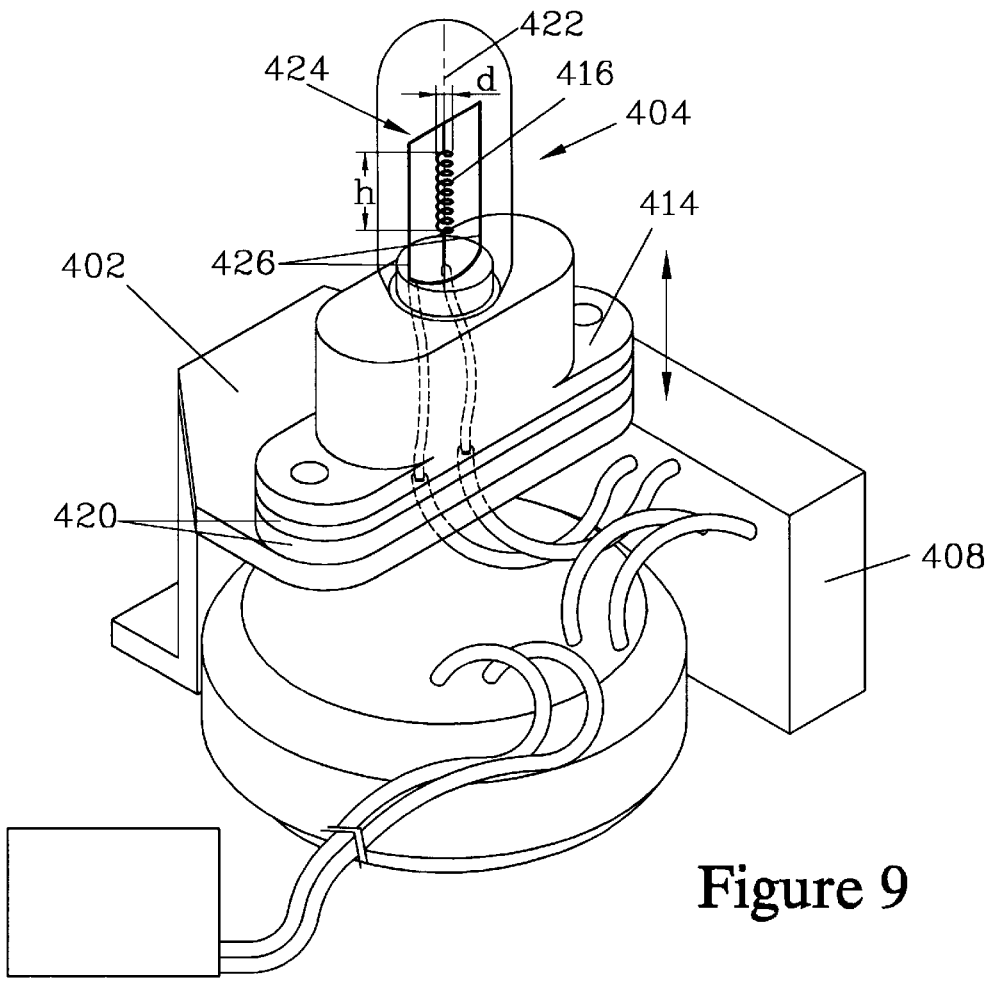
FIG. 9 is a view illustrating further details of the lamp and lamp bracket shown in FIG. 8.

As best shown in FIG. 9, in the embodiment illustrated the lamp base 414 may be mounted to the lamp bracket 402 via one or more shims 420. The number and thickness of the shims 420 employed can be varied to adjust the position of the lamp base 414 along a lens axis 422 of the Fresnel lens 406. The shims 420 thus serve to provide the means for adjusting the axial position of the lamp 404.

FIG. 9 also illustrates details of a second end support structure 424, which has a pair of second end filament leads 426 which are spaced apart from each other. Preferably, the second end filament leads 426 are symmetrically disposed about the filament 416. The use of paired spaced-apart second end filament leads 426 permits the use of finer gauge wire for the second end filament leads 426, thereby reducing the density and distribution of the resulting shadows.

Figure 10:
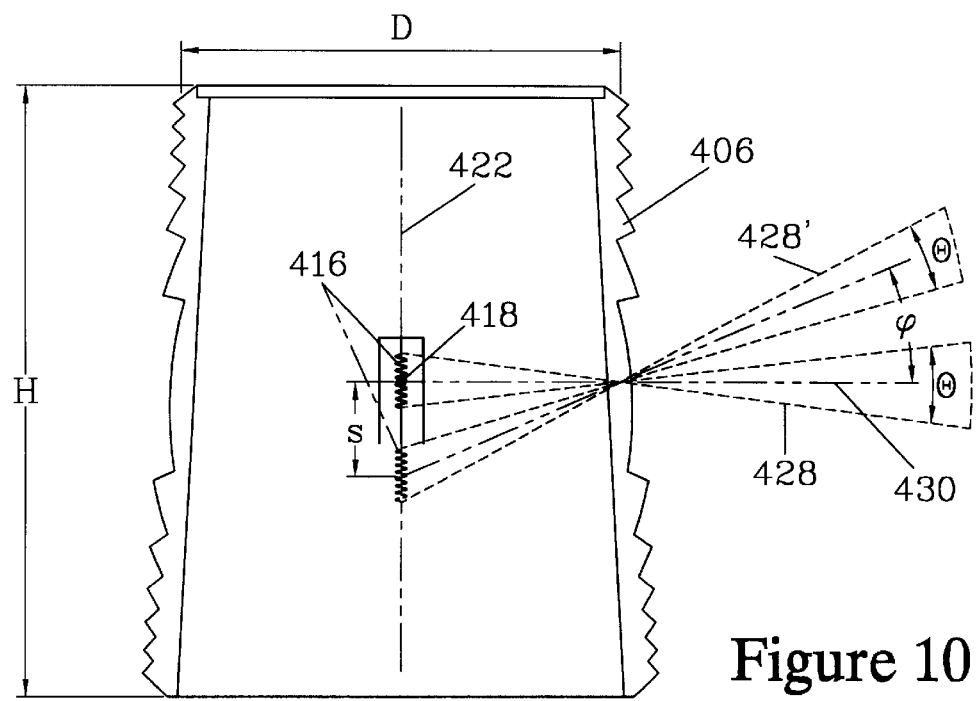
FIG. 10 is a schematic view illustrating the effect of adjusting the axial position of the lamp with respect to the Fresnel lens shown in FIG. 8, which allows the emitted beam of light to be vertically aimed.

FIG. 10 is a schematic section view of the luminaire 400, illustrating the relative position of the filament 416 relative to the Fresnel lens 406. Typically, the filament 416 is positioned such that it is centrally located with respect to the focal center 418 along the lens axis 422. Such positioning provides an emitted beam 428 which is symmetrically distributed with respect to a horizontal plane 430 in which the focal center 418 resides.

In some applications, it may be desirable to aim the light produced by the luminaire 400 in the vertical direction to minimize light directed downwards in the vicinity of the luminaire 400. Such aiming is frequently desired in the case of beacons, because of their flashing character and the high intensity of the lamp 404 employed. To vertically aim the emitted light, the filament 416 is offset (as is shown in phantom) with respect to the focal center 418 by an offset distance s in order to provide an emitted beam 428' which is aimed in the vertical direction by a vertical aiming angle $\phi$. This may be desirable in cases where viewers are unlikely to be positioned below the horizontal plane 430, or where light directed downwards creates undesirable light pollution. In such cases, the means for adjusting the axial position of the lamp 404 allow adjustment of the axial position of the filament 416 with respect to the focal center 418 to vary the offset distance s.

The vertical aiming angle $\theta$ of the emitted beam 428', to a first approximation, is determined by the offset distance s and the lens diameter D according to the following equation:

$$\theta = \arctan(2s/D) \quad \text{(Equation 2)}$$

While the offset distance s is exaggerated in FIG. 10 for illustrative purposes, in actuality it is preferred for the offset distance s to be no more than about 2–3% of the lens diameter D. It should be noted that when the offset distance s is zero, as is the case when the filament 416 is centrally disposed with respect to the focal center 418, the vertical aiming angle $\phi$ is zero, and the emitted beam 428 is symmetrically distributed with respect to the horizontal plane 430.

Figure 11:
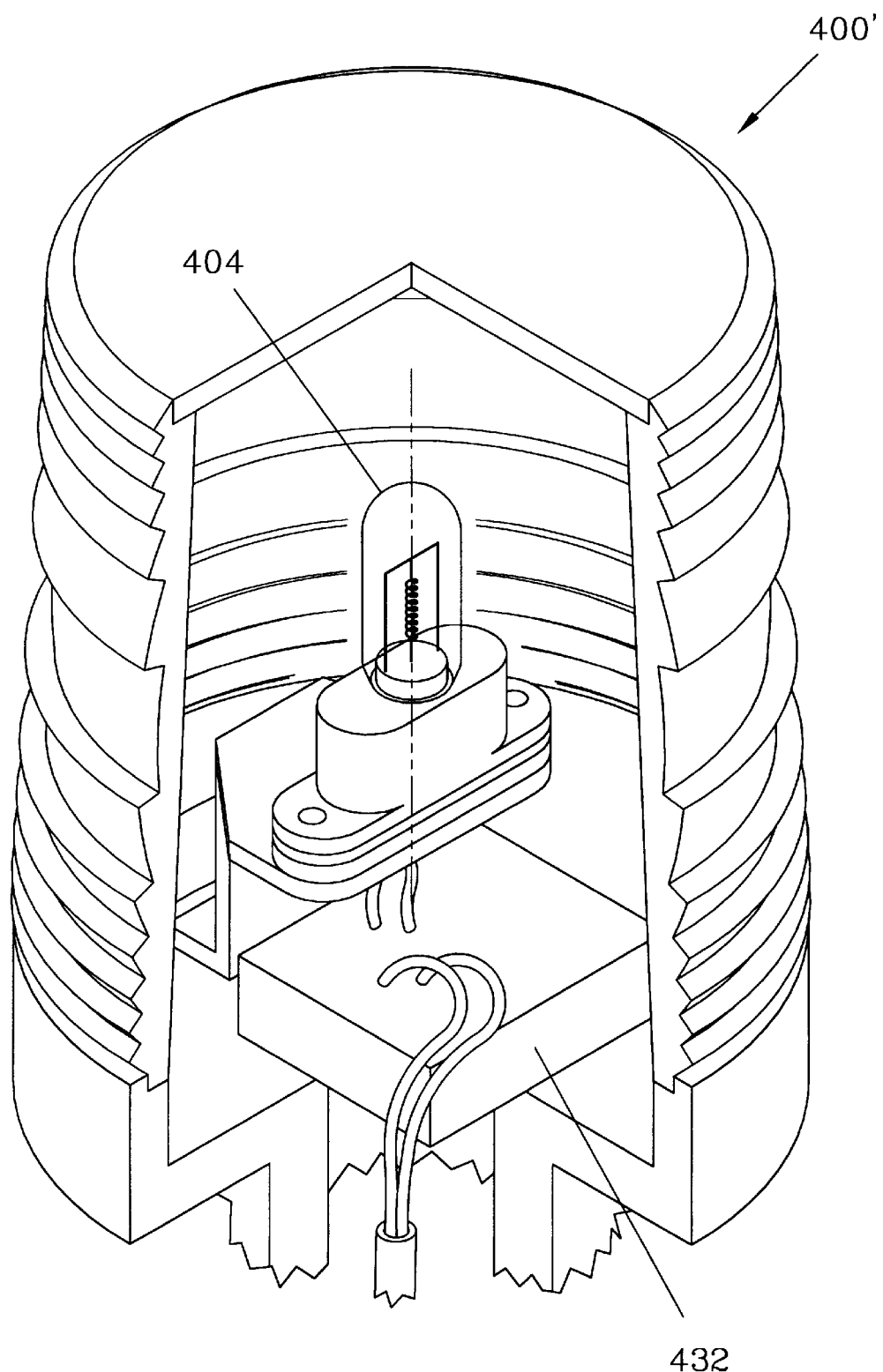
FIG. 11 is an isometric view of a luminaire of another embodiment of the present invention which is suitable for providing an airway obstruction warning beacon. In this embodiment, an electronic voltage controller Provides both means for reducing a power supply voltage to the lamp rated voltage, as well as means for intermittently supplying voltage to the lamp.

FIG. 11 is an isometric view of a luminaire 400' which is similar to the luminaire 400, but which employs an electronic voltage controller 432. The electronic voltage controller 432 provides means for reducing the power supply voltage $V_P$ to the lamp rated voltage $V_L$, as well as supplying the lamp 404 with power which is regulated to closely match the lamp rated voltage $V_L$. The electronic voltage controller 432 also includes internal means for intermittently supplying voltage to the lamp 404. Thus, in this embodiment, a separate flashing circuit such as the flashing circuit 408 is not necessary.

In order to provide a better understanding as to the structure of the device of the present invention, the following examples are offered to illustrate how particular embodiments could be constructed for particular applications.

EXAMPLE 1

For this example, a luminaire is being designed to operate in a remote area and is to be powered by batteries which are charged from solar cells. For this example, the batteries employed provide a supply voltage of 12 volts. The luminaire in this example is designed to serve as an airway obstruction light which meets the FAA requirements for a type L-810 device, which are as follows:

Luminaire design specifications:
 Minimum $\theta = 10°$
 Minimum light intensity=32.5 candela
 Center of vertical beam spread=+4°–+20°

With these specifications, the designer is free to choose the size of the substantially cylindrical Fresnel lens. For this example, the lens dimensions will be chosen to match the glass Fresnel lenses currently employed for airway obstruction lights which employ tungsten filament incandescent lamps. These Fresnel lenses have a lens diameter D and a lens height H as follows:

$D=3$ inches (76 mm)

$H=4$ inches (102 mm)

However, for this example an injection molded Fresnel lens is employed which lacks the vertical ridges which are present in the conventional Fresnel lenses which are designed for use with tungsten filament incandescent lamps. Such vertical ridges are eliminated to enhance the performance of the Fresnel lens.

With the geometry of the Fresnel lens selected and the minimum beam spread requirement of $\theta=10°$ set by the FAA requirements, the minimal effective length $l_E$ of the substantially linear filament should be about 0.26 inch (6.6 mm). The filament is formed from a double helical wound coil such as that illustrated in FIG. 3. The coil has a coil diameter d between about 0.04 and 0.06 inch (1.0–1.5 mm). Since the filament is to be used with a Fresnel lens which is free from vertical ridges, the support structure for the second filament end of the filament should be configured to reduce shadowing.

With these requirements, a halogen lamp rated at a lamp rated voltage $V_L$ of 12 volts and a power rating W of about 25 watts at the lamp rated voltage $V_L$ can be employed to light the luminaire. It is anticipated that a lamp of this design should have a filament life in excess of about 1 year of service. This would be substantially longer than the life of current airway obstruction light lamps, which typically have a life of about 6 months. Furthermore, the lamps currently used are rated at 116 watts; thus, the above described lamp would offer appreciable reduction in the energy required to operate the luminaire.

EXAMPLE 2

For this example, a luminaire is designed to operate in an area where 120 volt AC power is available at the site. The luminaire in this example is again for an airway obstruction light which meets the FAA requirements for an L-810 type device, which are described above.

With these specifications, the designer is again free to choose the size of the substantially cylindrical Fresnel lens. For this example, a commercially available glass Fresnel lens will be chosen. This Fresnel lens has internal vertical ridges for diffusing the light generated from the tungsten filament incandescent lamps which are used in the currently available luminaires. These Fresnel lenses have a lens diameter D and a lens height H as follows:

D=3 inches (76 mm)

H=4 inches (102 mm)

With the geometry of the Fresnel lens selected and the minimum beam spread requirement of $\theta=10°$ set by the FAA requirements, the minimal effective length $l_E$ of the substantially linear filament should be about 0.3 inch (7.6 mm). For this example, the filament is formed from a double helical wound coil having a coil diameter d between about 0.04 and 0.06 inch (1.0–1.5 mm). Since the filament is being used with a Fresnel lens having vertical ridges, the second end support structure for the filament may have only a single vertical second end filament lead, such as is used in the embodiment shown in FIG. 1.

Since the voltage of the power supply is too high to provide a satisfactory life of the lamp with a filament of this length, the voltage supplied to the lamp should be reduced. Again, for convenience, the voltage is reduced with a transformer mounted in the luminaire, which is selected to reduce the voltage to about 24 volts. With this requirement, a halogen lamp rated at a lamp rated voltage $V_L$ of 24 volts and a power rating W of 35 watts at the lamp rated voltage $V_L$ can be employed to light the luminaire.

While this example of airway obstruction warning light has not been optimized with respect to power consumption, there is an appreciable savings in energy from the use of such an airway warning light as compared to the prior art lights, and the life expectancy of this lamp is expected to be in excess of 1 year.

EXAMPLE 3

For this example, a luminaire is again being designed to operate in an area where 120 volt AC power is available at the site. The luminaire in this example is designed to serve as an airway obstruction warning beacon which meets the FAA requirements for a type L-864 device, which are as follows:

Luminaire design specifications
 Minimum $\theta=3°$
 Minimum light intensity=75° candela
 Peak effective light intensity=2,000+25% candela (minimum at 0° elevation, intensity at –1.0° must be at least 50% of this)
 Flash cycle: 20–40 flashes per minute, "on" time=½–⅔ of flash period With these specifications, the designer is free to choose the size of the substantially cylindrical Fresnel lens. For this example, a specially designed injection molded acrylic Fresnel lens is employed. The Fresnel lens has a lens diameter D and a lens height H as follows:

D=14⅞ inches (368 mm)

H=12 inches (305 mm)

The height is chosen such that H/D≈0.8, since such is felt to be a good compromise between efficiency and ability to fabricate by injection molding. With the geometry of the lens selected and the beam spread requirement of $\theta=3°$ set by the FAA requirements, the minimal effective length $l_E$ of the substantially linear filament should be about 0.38 inch (9.6 mm). For this example, the filament is formed from a double helical wound coil haven a coil diameter d of about 0.18 inch (4.6 mm). Since the filament is being used with a Fresnel lens which lacks vertical ridges, the second end support structure for the filament is configured to reduce shadowing.

Since the voltage of the power supply is too high to provide a satisfactory life of the resulting lamp with a filament of this length, the voltage supplied to the lamp should be reduced. Again, for convenience, the voltage is reduced with a transformer mounted in the luminaire, which reduces the voltage to 24 volts. With this requirement, a halogen lamp rated at a lamp rated voltage $V_L$ of 24 volts and a power W of 400 watts can be employed to light the luminaire. For this luminaire example, the flashing circuit is separate from the luminaire.

The prior art airway obstruction warning beacon is considerably less power efficient and requires two tungsten filament incandescent lamps, each operating at about 600 watts to meet the lighting requirement of the FAA. Furthermore, the prior art lamps have a average life of about 6 months when operated 12 hours per day, while the halogen lamps of the present invention have an expected life in excess of 1 year. Additionally, the use of a single lamp allows the luminaire to be constructed more compactly than conventional airway obstruction warning beacons.

EXAMPLE 4

Figure 12:
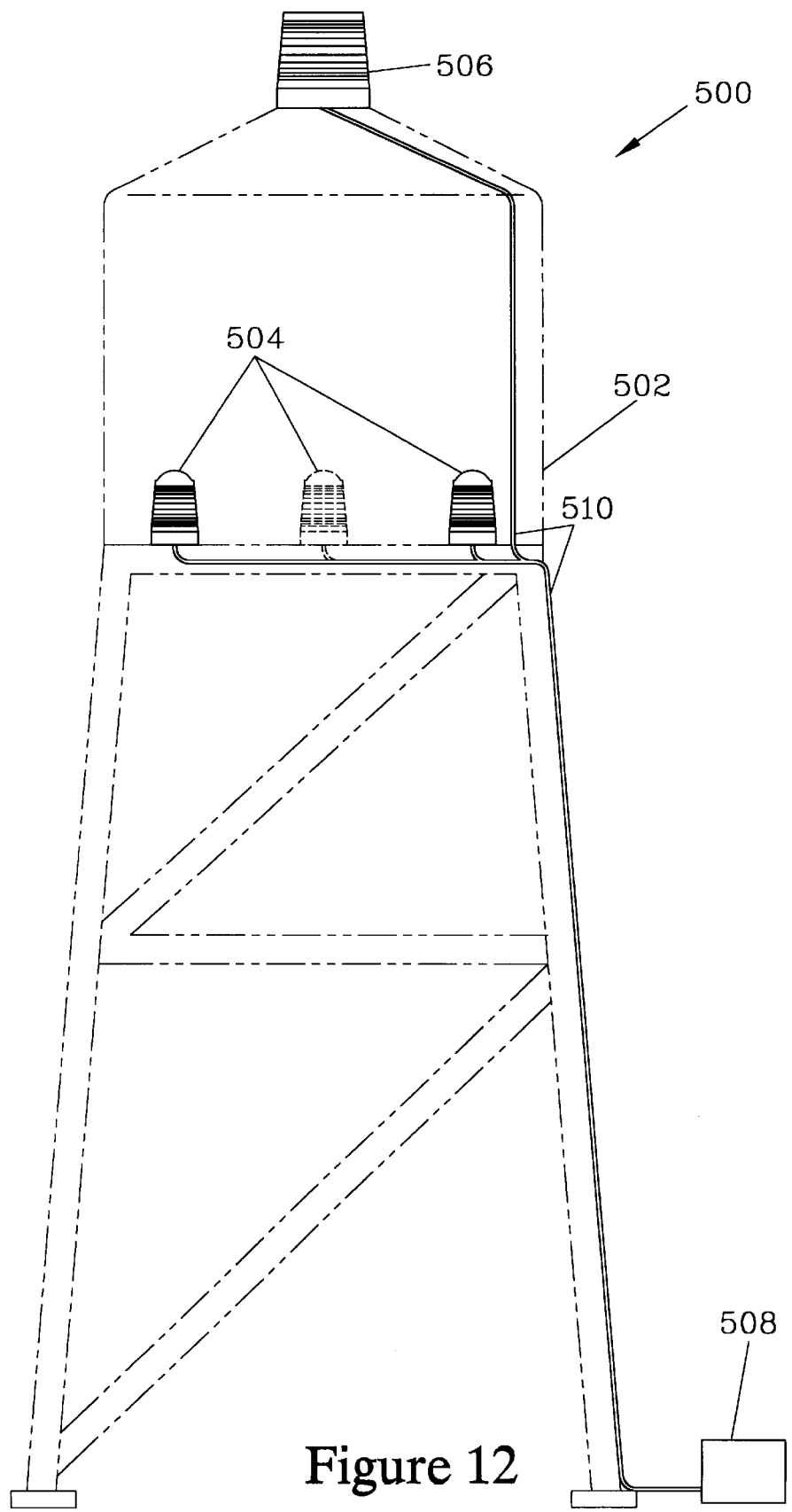
FIG. 12 illustrates a warning system for lighting an airway obstruction, which is illustrated installed on a tower. The warning system employs three obstruction lights which are each similar to the obstruction lights shown in FIGS. 5 and 6, which have lamps designed to operate at a lamp rated voltage $V_L$ which differs from the power source voltage $V_P$ of the power source used to energize the lamps. The obstruction lights are provided with internal transformers to reduce the voltage being supplied to the lamps. The system also employs an obstruction beacon which is similar to the obstruction beacon shown in FIGS. 8–10 and includes an internal transformer for reducing the voltage of the power being supplied by the power supply, as well as an internal flashing system.

This example is a warning system 500, which is illustrated in FIG. 12. The warning system 500 serves to alert pilots of a tower 502, shown in phantom. The warning system 500 has three airway obstruction lights 504, which are equally spaced around the tower. Each of these airway obstruction lights 504 is similar to the embodiment shown in FIG. 5. In addition, the warning system 500 has an airway obstruction beacon 506 which has an internal switching circuit for periodically interrupting the supply of power to the lamp, similar to that used in the embodiments illustrated in FIGS. 8 and 11. The warning system 500 is powered from a single ground based power supply 508 through wiring 510. Each of the luminaires (504, 506) has an internal transformer (not shown) to reduce the power supply voltage to the lamp rated voltage.

While the novel features of the present invention have been described in terms of particular embodiments and preferred applications, it should be appreciated by one skilled in the art that substitution of materials and modification of details obviously can be made without departing from the spirit of the invention.

What is claimed is:

1. A luminaire which operates under a power W provided by a power supply the luminaire comprising:
   a luminaire base;
   a substantially cylindrical Fresnel lens which attaches to said luminaire base, said substantially cylindrical Fresnel lens having a lens axis and being bounded by a surface of revolution about said lens axis and having a mean lens diameter D;
   a halogen lamp residing in said substantially cylindrical Fresnel lens, said halogen lamp having a lamp rated voltage $V_L$ which is between about 12 volts and 30 volts and further having,
      a lamp base,
      a lamp envelope which attaches to said lamp base, a substantially linear filament residing in said lamp envelope, said substantially linear filament being constructed from a filament wire terminating in a first filament end and a second filament end, with said first filament end being closer to said lamp base than said second filament end, said filament wire having a gauge g and a wire length $l_W$ and being configured such that said substantially linear filament has a filament axis which is substantially parallel to said lens axis and has an effective length $l_E$ which is the linear distance between said first filament end and said second filament end, said substantially linear filament being formed as a helical coil having a coil diameter d and a coil height h, said coil height h being said effective length $l_E$, the ratio D/d being greater than about 40, and the ratio h/d being greater than about 2½, and said effective length $l_E$ being less than about 1 inch a first end filament lead attaching to said first filament end and said lamp base and communicating with the power supply, and a second end support structure attaching to said second filament end and said lamp base and communicating with the power supply; and a lamp bracket attaching to said luminaire base and to said lamp base, said lamp bracket being configured such that said filament axis is substantially coincident with said lens axis.

2. The luminaire of claim 1 wherein said filament wire is a double wound helix.

3. The luminaire of claim 1 wherein the power supply produces a power supply voltage $V_P$ which is greater than said lamp rated voltage $V_L$ further wherein the luminaire further comprises:

means for reducing said power supply voltage $V_P$ to said lamp rated voltage $V_L$.

4. The luminaire of claim 3 wherein said means for reducing said power supply voltage $V_P$ is internal to the luminaire.

5. The luminaire of claim 1 wherein the luminaire is an airway obstruction warning light and further wherein said substantially cylindrical Fresnel lens is a red lens and wherein said filament effective length $l_E$ is greater than about 9% and no greater than about 10% of said lens diameter D.

6. A luminaire which operates under a power W provided by a power supply, the luminaire comprising:

a luminaire base;

a substantially cylindrical Fresnel lens which attaches to said luminaire base said substantially cylindrical Fresnel lens having a lens axis and being bounded by a surface of revolution about said lens axis and having a mean lens diameter D;

a halogen lamp residing in said substantially cylindrical Fresnel lens, said halogen lamp having, a lamp base, a lamp envelope which attaches to said lamp base, a substantially linear filament residing in said lamp envelope, said substantially linear filament being constructed from a filament wire terminating in a first filament end and a second filament end, with said first filament end being closer to said lamp base than said second filament end, said filament wire having a gauge g and a wire length $l_W$ and being configured such that said substantially linear filament has a filament axis which is substantially parallel to said lens axis and has an effective length $l_E$ which is the linear distance between said first filament end and said second filament end, said effective length $l_E$ being less than about 1 inch, a first end filament lead attaching to said first filament end and said lamp base and communicating with the power supply, and a second end support structure attaching to said second filament end and said lamp base and communicating with the power supply, said second end support structure being configured to provide means for reducing shadowing cast by said second end support structure on said substantially cylindrical Fresnel lens with respect to any given radial direction; and a lamp bracket attaching to said luminaire base and to said lamp base said lamp bracket being configured such that said filament axis is substantially coincident with said lens axis.

7. The luminaire of claim 6 wherein said means for reducing shadowing cast by said second end support structure is provided by a ramp-shaped support which serves as said second end support structure.

8. The luminaire of claim 6 wherein said means for reducing shadowing cast by said second end support structure is provided by a helix-shaped support which serves as said second end support structure.

9. The luminaire of claim 6 wherein the luminaire is an airway obstruction warning beacon and further wherein said substantially cylindrical Fresnel lens is a red lens and wherein said filament effective length $l_E$ is greater than about 2.6% and no greater than about 3.5% of said lens diameter D.

10. The airway obstruction warning beacon of claim 9 wherein said substantially cylindrical lens is an injection molded UV-resistant acrylic lens, and further wherein said lamp rated voltage $V_L$ is further restricted to between about 20 volts and 30 volts.

11. The airway obstruction warning beacon of claim 10 further comprising:

means for periodically interrupting communication between the power supply and said halogen lamp.

12. The airway obstruction warning beacon of claim 11 further comprising:

means for adjusting the axial position of said lamp base with respect to said substantially cylindrical Fresnel lens.

13. The luminaire of claim 9 wherein said substantially linear filament is formed as a double wound helical coil.

14. The luminaire of claim 6 wherein said means for reducing shadowing cast by said second end support structure is provided by at least two second end filament leads which serve as said second end support structure.

15. A luminaire for use as an airway obstruction warning beacon which operates under a power W provided by a power supply, the luminaire comprising:

a luminaire base;

a substantially cylindrical Fresnel lens which attaches to said luminaire base, said substantially cylindrical Fresnel lens having a lens axis and being bounded by a surface of revolution about said lens axis and having a mean lens diameter D, said substantially cylindrical Fresnel lens being a red lens, a halogen lamp residing in said substantially cylindrical Fresnel lens, said halogen lamp having, a lamp base, a lamp envelope which attaches to said lamp base, a substantially linear filament residing in said lamp envelope, said substantially linear filament being constructed from a filament wire terminating in a first filament end and a second filament end, with said first filament end being closer to said lamp base than said second filament end, said filament wire having a gauge g and a wire length $l_W$ and being configured such that said substantially linear filament has a filament axis which is substantially parallel to said lens axis and has an effective length $l_E$ which is the linear distance between said first filament end and said second filament end, said effective length $l_E$ being less than about 1 inch, and being greater than about 2.6% and no greater than about 3.5% of said lens diameter D, a first end filament lead attaching to said first filament end and said lamp base and communicating with the power supply, a second end support structure attaching to said second filament end and said lamp base and communicating with the power supply; and a lamp bracket attaching to said luminaire base and to said lamp base, said lamp bracket being configured such that said filament axis is substantially coincident with said lens axis.

16. The luminaire of claim 15 wherein said substantially cylindrical lens is an injection molded UV-resistant acrylic lens, and further wherein said halogen lamp has a lamp rated voltage $V_L$ which is between about 20 volts and 30 volts.

17. The luminaire of claim 16 further comprising:

means for periodically interrupting communication between the power supply and said halogen lamp.

18. The luminaire of claim 17 further comprising:

means for adjusting the axial position of said lamp base with respect to said substantially cylindrical Fresnel lens.

* * * * *